United States Patent
Derevyagin

(10) Patent No.: US 6,212,951 B1
(45) Date of Patent: Apr. 10, 2001

(54) FLOW VELOCITY MEASURING UNIT

(76) Inventor: Alexandr Mikhailovich Derevyagin, Sivtsev Vrazhek, 44, AP. 23, 121002, Moscow (RU)

(*) Notice: Subject to any disclaimer, the term of this patent is extended or adjusted under 35 U.S.C. 154(b) by 0 days.

(21) Appl. No.: 09/114,039

(22) Filed: Jul. 10, 1998

Related U.S. Application Data

(63) Continuation of application No. PCT/RU97/00122, filed on Apr. 23, 1997.

(30) Foreign Application Priority Data

Apr. 30, 1996 (RU) .................................................. 96108866

(51) Int. Cl.[7] ............................... G01N 7/00; G01N 21/00
(52) U.S. Cl. ........................................ 73/335.01; 73/61.48
(58) Field of Search ................ 73/861.25, 61.4, 73/335.01, 514.26, 861.77

(56) References Cited

U.S. PATENT DOCUMENTS 3,030,802 * 4/1962 Aarts et al. .......................... 73/64.48
4,172,428 10/1979 Pariset ................................... 116/276
5,920,010 * 7/1999 Derevyagin et al. ............. 73/335.01

FOREIGN PATENT DOCUMENTS

| 2546492 | 8/1977 | (DE) . |
| 268481 | 3/1965 | (SU) . |
| 481836 | 12/1973 | (SU) . |
| 1053005 | 12/1982 | (SU) . |

OTHER PUBLICATIONS

Abstract of SU 168481 of Mar. 1965.
Abstract of SU 481836 of 1973.
Abstract of SU 1053005 of 1982.

* cited by examiner

Primary Examiner—Harshad Patel
(74) Attorney, Agent, or Firm—Ladas & Parry

(57) ABSTRACT

A Doppler flow velocity measuring unit wherein an optical unit including a laser and a photodetector is removably mounted on a pipeline is disclosed. The optical unit is attached to a pipe that is affixed to the pipeline at right angles to the flow in the pipeline. The pipe includes a shutoff valve that closes the pipe, permitting the optical unit to be removed from the pipeline.

4 Claims, 1 Drawing Sheet

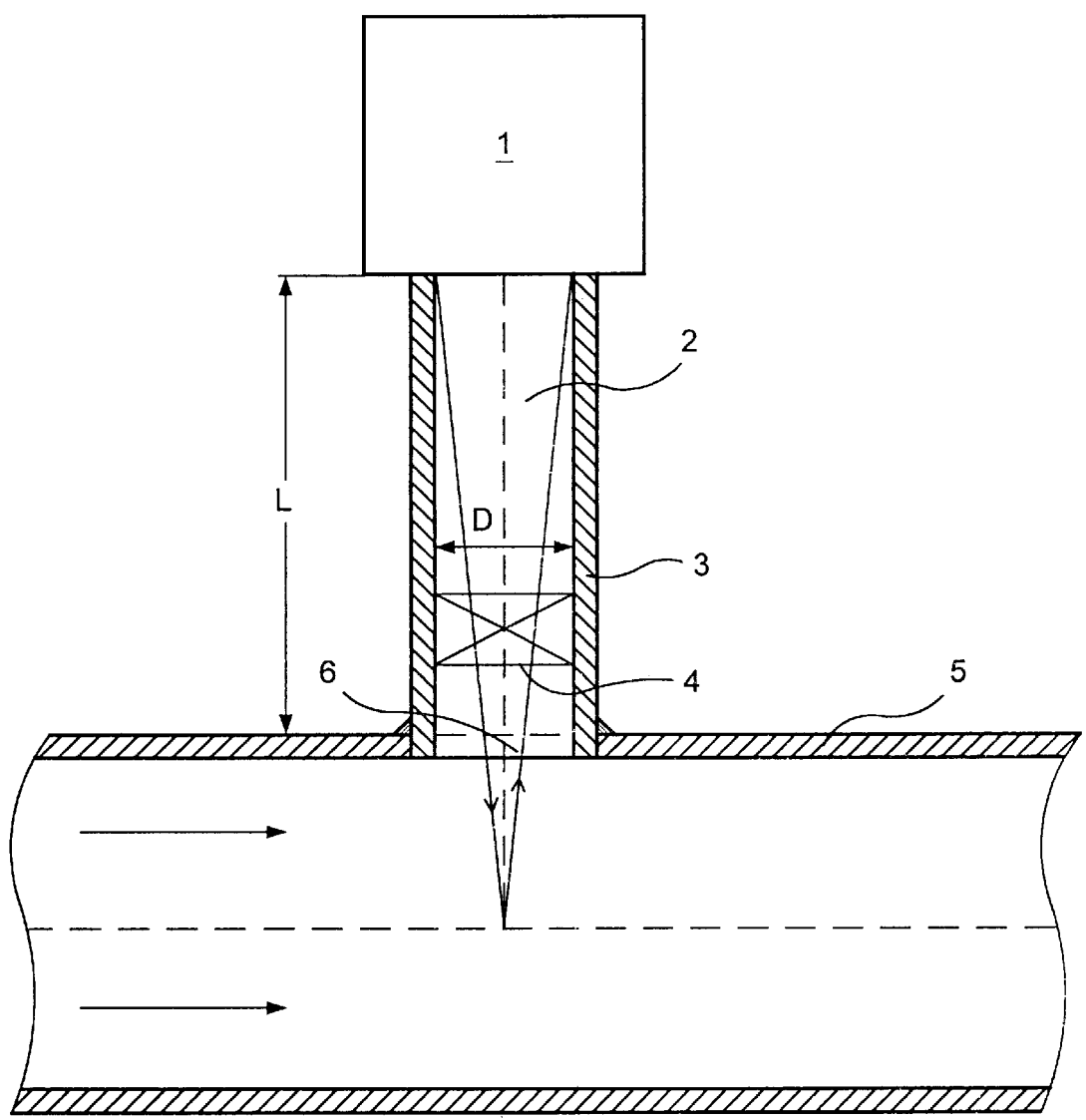

FLOW VELOCITY MEASURING UNIT

This is a continuation of copending application International Application PCT/RU97/00122 filed on Apr. 23, 1997 and which designated the U.S.

FIELD OF THE INVENTION

The invention relates to the field of control and measuring technology, and more exactly, to a unit for measuring the flow of continuous optically transparent mediums for example, optical flow velocity measuring units using Doppler methods on gases, liquids, etc.

DESCRIPTION OF RELATED ART

A flow velocity measuring unit is known which comprises an optical unit including a laser and a photodetector (SU No. 1053005, 1982).

However, the known apparatus does not ensure sufficiently accurate measurement because of the possibility of contamination of elements of the optical unit with impurities in the medium being studied.

A flow velocity measuring unit is known which comprises an optical unit including a laser and a photodetector (SU No. 48 836, 1973).

However, this known apparatus does not prevent contamination of elements of the optical unit with impurities of the medium being studied, and this reduces the accuracy of measurement.

SUMMARY OF THE INVENTION

The principal object at the base of the invention is to provide an apparatus which ensures that the necessary accuracy of flow velocity measurement is achieved with high reliability.

The technical result is reduction of possible contamination of elements of the optical unit with impurities of the medium being studied.

This object is achieved in a flow velocity measuring unit comprising an optical unit including a laser and a photodetector, in that a gravitational filter provided by a pipe having a length at least three times greater than the diameter thereof is included in the measuring unit. The pipe is disposed above the surface of a pipeline one end of the pipe is mounted in the aperture made in the pipeline, and an optical unit is secured on the other end of the pipe. According to the invention, the gravitational filter may be also provided with a shut-off cock.

The essence of the invention is that the presence of a gravitational filter effect in a pipe in a certain length and diameter makes it possible to create a zone of stagnation of the medium being studied, for example, gas, at the input and the optical unit. This stagnation zone makes it possible to substantially reduce contamination of the elements of the optical unit.

BRIEF DESCRIPTION OF THE DRAWINGS

A functional diagram of the proposed apparatus is shown in the drawing.

BEST METHOD OF CARRYING OUT THE INVENTION

A flow velocity measuring unit comprises an optical unit 1 with a laser, photodetector and recorder (not shown in the drawing), and a gravitational filter 2 made in the form of a pipe 3 in which a shut-off cock 4 is mounted.

One end of the pipe 3 of the gravitational filter 2 is mounted on the top side of a pipeline 5 in an aperture 6 and is secured, for example, by means of welding.

The optical unit 1 is secured on the other end of the pipe 3 by means of, for example, a threaded connection.

The length L of the pipe exceeds by more than three times its diameter D, and the apparatus operates in the following manner.

When the apparatus is turned on with the shut-off cock 4 open, measurement of the flow velocity of a medium, for example, gas, begins.

A laser beam, passing through the pipe 3 of the gravitational filter 2 falls on the gas flow moving in the pipeline 5 and reflected light from gas particles is received by the photodetector of the optical unit 1. A converted signal from the optical unit 1 is then provided to the recorder.

The gravitational filter 2 in the figure makes is possible to divide the flowing liquid (or gaseous) from solid (or liquid) impurities therein by means of the gravitational field of Earth. Thus the gravitational filter 2, using the action of gravitational forces in the pipe 3 prevents the passage of different impurities of the medium being studied to the optical unit.

When the ratio of the length of the pipe 3 to its diameter is equal to or less than 3, a stagnation zone is not formed and gas impurities can collect on elements of the optical unit 1, as a result of turbulent flows, causing contamination and resulting in reduced measurement accuracy.

The presence of the cock 4 makes it possible to repair the optical unit 1, and to disconnect it if necessary.

Thus, connection of the gravitational filter 2 to the input of the optical unit 1 and positioning it above the surface of the pipeline 5 and on its upper top side makes it possible to substantially reduce the contamination of elements of the optical unit 1, thus enhancing the reliability and the accuracy of measurement.

Industrial Applicability

The aforesaid advantages of the proposed apparatus ensure the possibility of wide use of that apparatus during the measurement of flows of continuous, optically transparent mediums (gases, liquids, etc.).

It will be apparent to one skilled in the art that variations and modifications are possible within the spirit and scope of the invention. The invention is defined by the appended claims. An abstract on a separate page is also provided.

What is claimed is:

1. A flow velocity measuring unit for measuring a flow velocity of a fluid flowing through a pipeline (5) having an aperture (6), said measuring unit comprising:

an optical unit (1) including a laser and a photo detector; and a pipe (3) having a first end attached to said aperture (6), the combination of said pipe (3) and said aperture (6) being flush with an inner surface of the pipeline (5), said optical unit (1) being secured to a second end of the pipe (3), said pipe (3) having a length (L) and a diameter (D), said length (L) being at least three times greater than said diameter (D) of said pipe (3).

2. A flow velocity measuring unit according to claim 1, further comprising a cock (4) in the pipe (3) to selectively shut off said aperture (6).

3. A method of optically measuring a flow velocity of a fluid flowing through a pipeline (5) having an aperture (6), said method comprising the steps of:

attaching a first end of a pipe (3) to said aperture (6) so that the combination of said aperture (6) and said pipe is flush with an inner surface of the pipeline (5), said pipe (3) having a length (L) and diameter (D), said length (L) of said pipe (3) being at least three times greater than the diameter (D) of said pipe (3);

securing an optical unit (1) including a laser and a photo detector to a second end of said pipe (3); and using said optical unit (1) secured to said pipe (3) to measure the flow velocity in the pipeline (5).

4. The method of claim 3 above further comprising the step of providing a cock (4) in the pipe (3) to selectively shut off the aperture (6) in the pipeline (5) when disconnecting said optical unit (1).

* * * * *